United States Patent [19]

Bennett et al.

[11] Patent Number: 4,656,616

[45] Date of Patent: Apr. 7, 1987

[54] VOLUMETRIC TRANSDUCER ARRAY AND ERECTING STRUCTURE

[75] Inventors: Derek J. Bennett; Gene Anderson, both of Thousand Oaks, Calif.

[73] Assignee: The United States of America as represented by the Secretary of the Navy, Washington, D.C.

[21] Appl. No.: 638,389

[22] Filed: Dec. 4, 1975

[51] Int. Cl.[4] .............................................. H04B 13/00

[52] U.S. Cl. .................................... 367/153; 367/165; 367/173

[58] Field of Search .................... 340/2 R, 8 R, 8 S, 9; 9/8 R; 343/709, 88; 367/153–156, 157, 165, 173

[56] References Cited

U.S. PATENT DOCUMENTS

| | | | |
|---|---|---|---|
| 2,310,017 | 2/1943 | Canon et al. | 340/2 |
| 3,141,148 | 7/1964 | Hueter | 340/8 S |
| 3,444,511 | 5/1969 | Morrow | 340/8 S |
| 3,539,979 | 11/1970 | Crall | 340/8 S |
| 3,566,346 | 2/1971 | Scopatz | 340/8 S |
| 3,886,491 | 5/1975 | Jonkey | 340/8 S |

*Primary Examiner*—Harold J. Tudor
*Attorney, Agent, or Firm*—R. S. Sciascia; Henry Hansen

[57] ABSTRACT

A structure for support of a volumetric transducer array that self-erects when deployed in water. Dual assemblies of radially arranged telescoping arms are coaxially aligned to support a plurality of linear transducer arrays which are secured to the ends of corresponding arms between the assemblies. The arms are each telescoped outwardly by respective support cables which are tensed by suspending the deployed array between a float and a terminal mass.

10 Claims, 7 Drawing Figures

FIG. 1
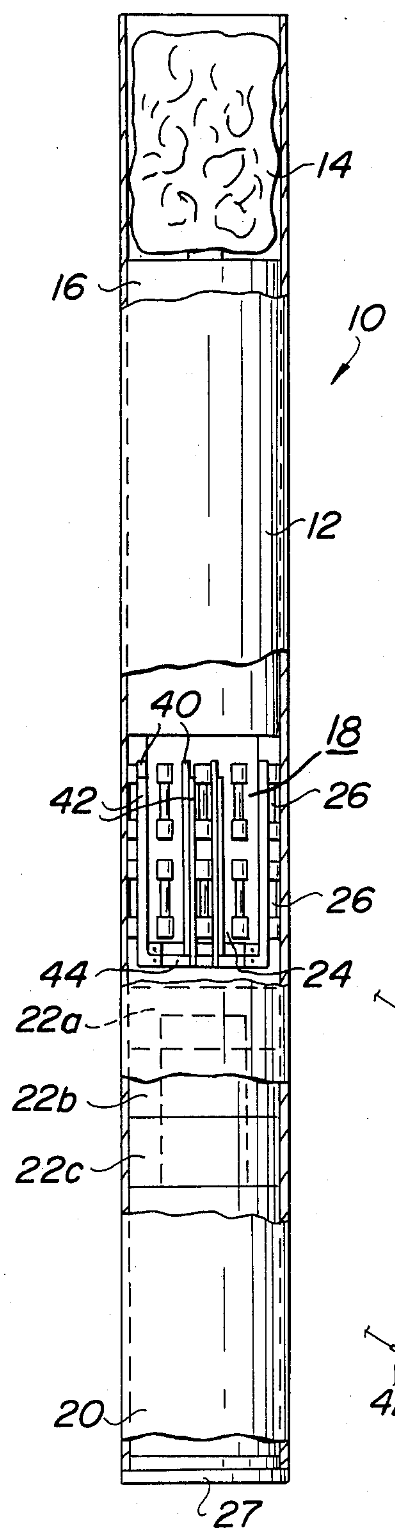
FIG. 2
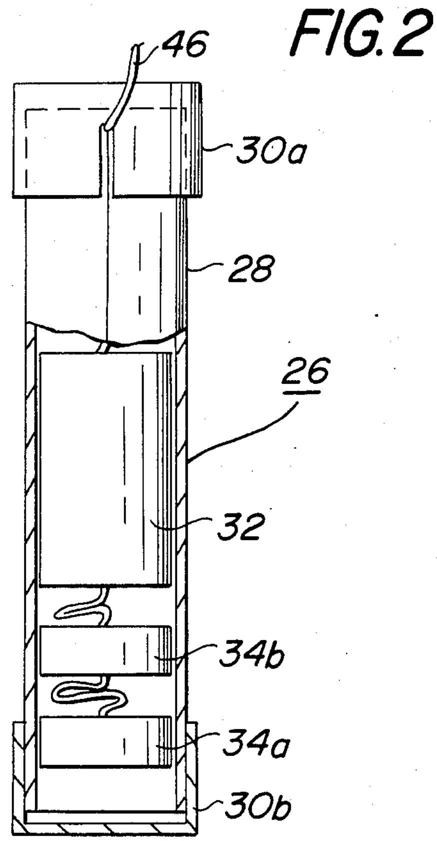
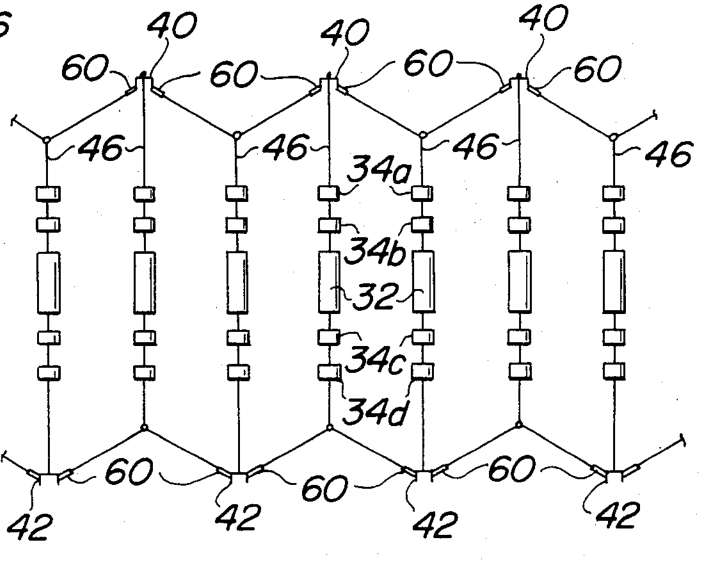
FIG. 5

VOLUMETRIC TRANSDUCER ARRAY AND ERECTING STRUCTURE

STATEMENT OF GOVERNMENT INTEREST

The invention described herein may be manufactured and used by or for the Government of the United States of America for governmental purposes without the payment of any royalties thereon of therefor.

BACKGROUND OF THE INVENTION

This invention relates generally to underwater sensing apparatus and more particularly to a telescoping transducer array and structure for erection of the same.

In the sonar field, prior art units have been constructed which employ a plurality of transducers in a three-dimensional configuration. A volumetric transducer array becomes particularly desirable in light of spatial separation requirements for correlation of sonar signals. It is desirable, therefore, that the array supporting structures be unencumbered and as simple as possible. Such a structure must be easily packaged, preferably within a conventionally sized sonobuoy canister, and must withstand launching and pressure stresses and be capable of efficient and smooth deployment while assuming an operating position. There are, therefore, outstanding requirements for a self-erecting array which includes among its performance characteristics as small a size and weight figure as possible as well as good overall operational reliability. To perform in a proper manner electrically, excellent rigidity and stability of the array proper is required.

SUMMARY OF THE INVENTION

Accordingly, it is an object of the present invention to provide a self-erecting structure of novel construction for the extension and support of transducer equipment arranged in a volumetric array. Another object is to provide a small size and lightweight transducer array which is conveniently packageable within a conventional sonobuoy canister. Still another object is to provide a distensible transducer array structure adapted to be launched and retrieved at sea under a wide variety of service conditions.

Briefly, these and other objects are accomplished by a structure for support of a volumetric transducer array that self-erects when deployed in water. Dual assemblies of radially arranged telescoping arms are coaxially aligned to support a plurality of transducer array stave lines which are secured to the ends of corresponding arms between the assemblies. The arms of each assembly are folded and interstitially arranged in a circular arrangement so as to be packaged within a conventional sonobuoy canister. The packaged structure is placed in the canister between a float and a terminal mass such as a transducer projector unit. Upon dropping the canister into the sea, the float is released from the sinking canister by a support cable which ultimately pays out to a preselected depth at which time the packaged array and support structure as well as the transducer projector unit are released from the bottom of the canister and connected thereto by other support cables. The dual assemblies are pulled away from each other due to the opposing forces of the float and the transducer projector unit and in so doing cause the telescoping arms to assume horizontal positions with respect to each other and substantially parallel with the surface of the sea. Further tensile stresses produced in the deployed array operate a plurality of support lines respectively attached to each of the telescoping arms which actuate each arm to the maximum telescoped position thereby supporting a substantially cylindrical transducer array upon stave lines connected between the outer ends of corresponding telescoped arms.

For a better understanding of these and other aspects of the invention, reference may be made to the following detailed description taken in conjunction with the accompanying drawings.

BRIEF DESCRIPTION OF THE DRAWINGS

FIG. 1 is a sectional view of the invention as packaged within a sonobuoy canister;

FIG. 2 is a magnified sectional view of a hydrophone package shown in FIG. 1;

FIG. 5 is an elevation view of a portion of the transducer array in a planar projection;

DESCRIPTION OF THE PREFERRED EMBODIMENT

Figure 3:
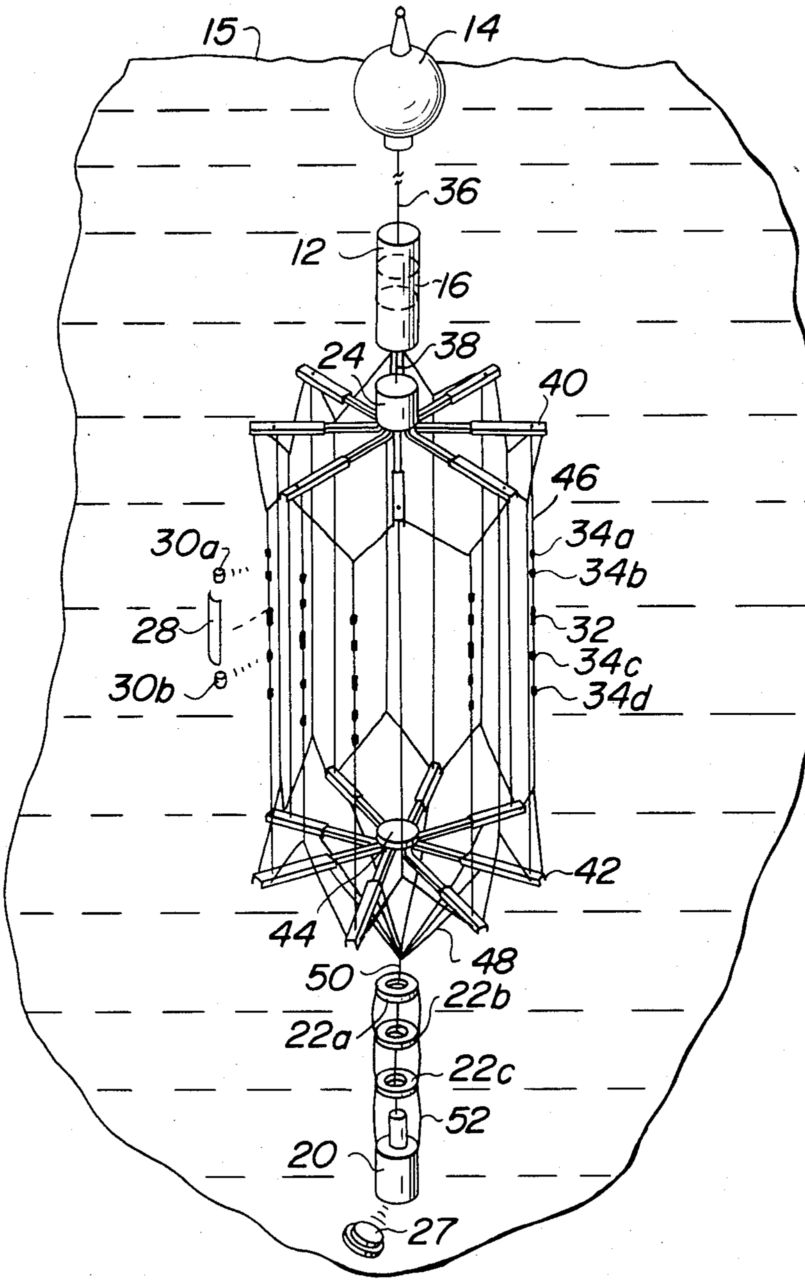
FIG. 3 illustrates the invention is a deployed sonobuoy system.

Referring now to FIG. 1 there is shown a sonobuoy package 10 comprising a canister 12 housing therein at one end an antenna float 14, a cable pack 16, a folded volumetric transducer array 18 and a transducer driver unit 20. Coaxially positioned over one end of the driver unit 20 is a series of three transducer projector rings ***22a*, *22b*, *22c*. An electronics package 24 is coaxially positioned interior to the folded array 18. Nested within the outer folds of the array 18 are a plurality of transducer packages 26 each of which comprises a hydrophone assembly enclosed within a mylar container. An impact releasable plug 27 is attached to the end of the canister 12 enclosing the driver unit 20**.

Referring now to FIG. 2 there is shown a magnified break away away view of one of the hydrophone assemblies 26 shown in FIG. 1. The packaged assembly 26 comprises a cylindrical fold of thin mylar sheathing 28 which overlaps slightly along the length thereof. At each end of the cylindrical sheathing 28 is positioned an end cap ***30a*, *30b*, which, for example, may also be made of mylar and which provides a snug fit over the ends of the cylinder. Each of the caps 30 also has a slot formed by a partial cutout of the mylar material from the sidewall of the end cap and which permits the easy entry of electrical and support cables for connection to the enclosed hydrophones. The combination of the end cap slot and the electrical wire will also be utilized, as will be explained hereinafter, to effect convenient deployment of the array transducers. Each of the transducer assemblies 26 also includes a transducer preamplifier 32 and four hydrophones *34a–d* of which only two are fully shown in the figure. As will be more clearly seen hereinafter the transducer electronics are serially interconnected such that the preamplifier 32 is positioned between dual pairs of hydrophones *34a*, *34b* and *34c*, *34d*.**

Referring now to FIG. 3 there is shown the volumetric transducer array and support apparatus of the present invention deployed in an operational mode. The antenna float 14 is positioned at the top surface 15 of the water body and is connected to the cable pack 16 within the canister 12 by a primary suspension cable 36. Descending from the bottom of the canister 12 and connected by a secondary suspension cable 38 is the electronics package 24. The package 24 is formed in the shape of a cylinder and on the botommost edge thereof are hinged a plurality of eight telescoping arms which extend radially from the package 24. Similar to the upper set of telescoping arms 40 is a lower set of telescoping arms 42 radially hinged about the bottom surface of a central platform disc 44. Attached to the outer extremities of each of the telescoping arms 40, 42 is a plurality of 16 hydrophone stave lines 46 which interconnect the upper and lower sets of arms. Angled support lines 48 each connected at one end respectively to an approximate point midway along the length of a lower telescoping arm are all commonly connected at the other ends thereof to a terminal support cable 50 whose other end is terminated at the transducer driver unit 20. The projector rings 22*a–c* are shown in their deployed and expanded positions in which each ring is separated by a predetermined distance and connected to one another and the unit 20 by a plurality of four rubber lines 52 coaxially arranged in quadrature about the outer circumference of each of the rings 22. The mylar sheathing 28 and the end caps 30*a, b* are shown as separating from the deployed array as the array expands to assume its fully distended operating position. Similarly, the releasable plug 27 is shown dropping away from the array system.

Figure 4:
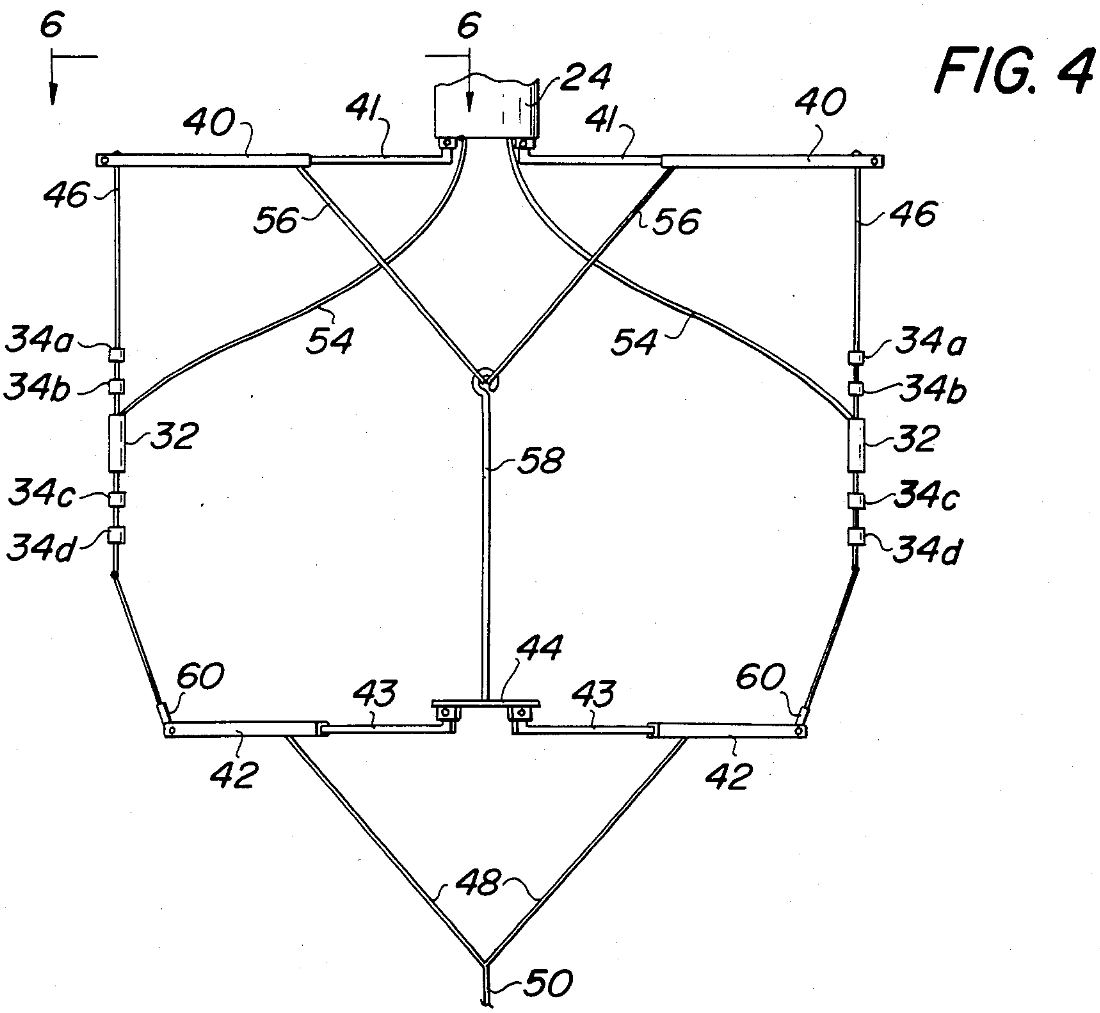
FIG. 4 is a magnified view of a portion of the deployed array and supporting structure shown in FIG. 3.

Referring now to FIG. 4 there is shown a sectional view of the deployed array as well as portions of the erecting structure involved with the present invention. More clearly shown is the hinge arrangement between the telescoping arms 40 and the bottom of the electronics package 24. Attached near the outer ends of the arms 40 are the hydrophone stave lines 46 having at the approximate center thereof the preamplifier 32 and offcenter thereof the hydrophone pairs 34*a*, 34*b* and 34*c*, 34*d*. Electrical interconnection is provided by a plurality of lines 54 connected between the output of electronics package 24 and the respective preamplifiers 32 on each of the hydrophone stave lines 46. Each of the arms 40 is caused to telescope to a fully distended position by means of angled support lines 56 which are connected, respectively, to upper inner support arms 41 upon which are supported corresponding arms 40. The use and operation of the support lines 56 will be explained in greater detail hereinafter. The outer end of the lines 56 are commonly connected to one end of a main support line 58 whose other end is connected to the center of the bottom platform disc 44. The bottom set of radially extending telescoping arms 42 are shown operatively hinged to the bottom of the platform disc 44 by lower inner support arms 43 in a manner similar to the hinging of the upper telescoping arms 40. The hydrophone stave lines 46 are shown connected to points at the outer extremities of the lower arms 42 by means of a compliant rubber cable sections 60 which are introduced into the array system in order to relieve and dampen high frequency stresses that may be produced in the stave line system. The compliant rubber cable 60 is positioned at one end only of each of the stave lines 46 and, when combined with a similar rubber section from an adjacent telescoping arm, forms a V pattern which is geometrically symmetrical about the outer circumference of the array support structure.

FIG. 5 illustrates an elevation view of a portion of the hydrophone stave line array in a planar projection. More clearly shown is the geometrical arrangement between the stave lines 46, the various rubber cable sections 60, the upper telescoping arms 40, and the lower telescoping arms 42. As between any two upper or lower telescoping arms, predetermined length pairs of rubber cable 60 are commonly joined to form a V and connect with one end of the stave line 46 whose other end is connected directly to a corresponding arm of an opposing radial set of arms. Also, the figure clearly discloses the interstitial relationship and placement of the upper set of radially extending telescoping arms 40 and the lower set of radially extending telescoping arms 42. That is, the upper set and lower set of arms are vertically interrelated such that the final positioning or deployed position of the arms is such that the distended arms of one set are horizontally displaced to be positioned midway between the extended positions of any two adjacent arms of the opposing set while, of course, being vertically displaced by a distance approximately equal to the length of any one of the stave lines 46. In this manner, there is a doubling of the number of stave lines that can be effectively positioned on the array given a limited number of telescoping arms. Moreover, each stave line is flexibly supported on one end thereof by a pair of compliant rubber cable sections 60.

Figure 6:
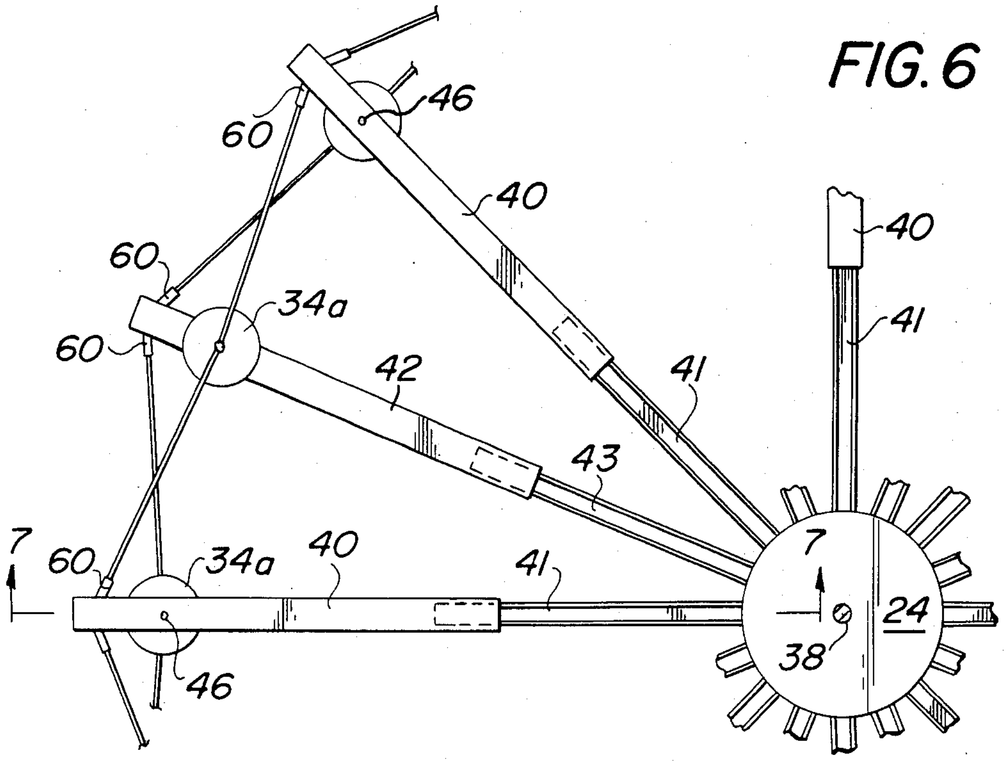
FIG. 6 is a top elevation view of a portion of the support structure shown in FIG. 3.

Referring now to FIG. 6 there is shown a top elevational view of a portion of the upper set of telescoping arms as shown in FIG. 4 and pointing out in greater detail the interstitial radial relationship between the upper and lower set of telescoping arms as well as selected portions of the telescoping mechanisms themselves. Each of the upper telescoping arms 40 includes an inner sliding member 41 shaped in the form of a U channel open at the top as shown in the view of FIG. 6 and which is hinged at one end thereof to the bottom of electronics package 24. Contrariwise, the telescoping portion of the arm 40 is also formed from an open U channel but the opening is directed downward in the view shown in FIG. 6. The width of telescoping arm 40 is sufficiently larger than the width of the inner member 41 such that the arm 40 conveniently slides along the length and over the top of the member 41. The telescoping operation and interrelationship between the arm 40 and the inner member 41 will be described in greater detail hereinafter. Attached at the outermost extremity of the telescoping arms 40 are the rubber cable sections 60 which are commonly connected at the other ends thereof to an end of a particular one of the stave lines 46. More in toward the centers of the telescoping arms 40 are connected the respective other ends of adjacent transducer stave line 46. Similarly, there are illustrated the lower telescoping arms 42 and lower support members 43 which extend radially outward from the platform disc 44 (not shown).

Figure 7:
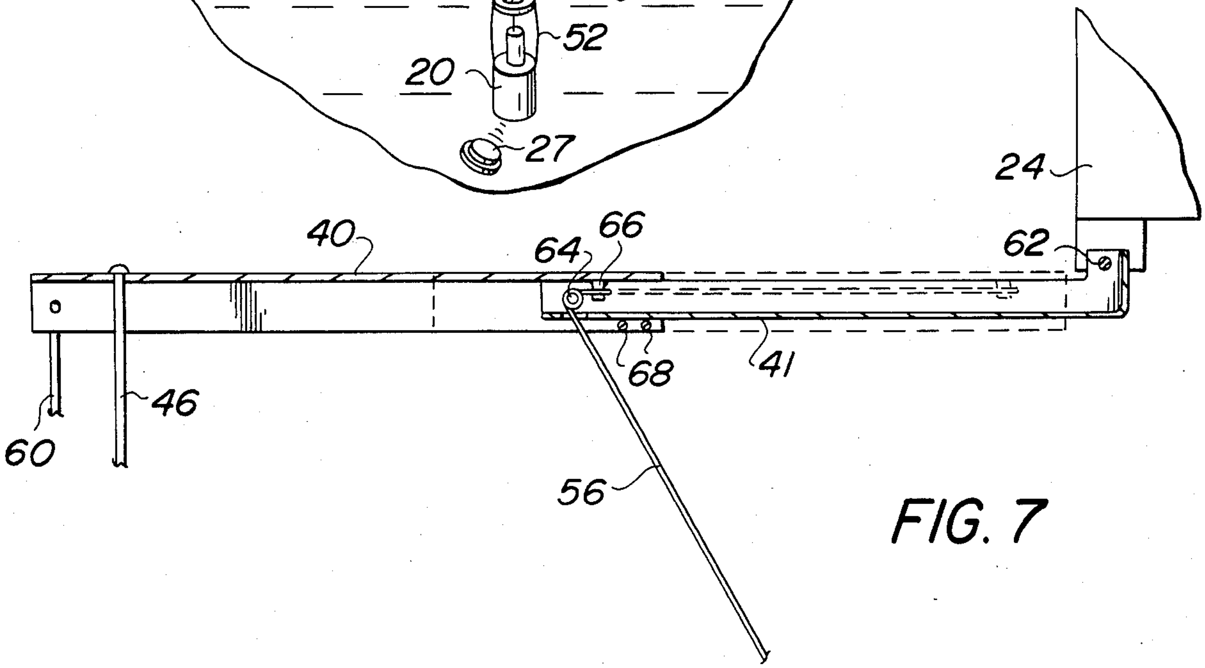
FIG. 7 is a side elevation sectional view of a telescoping arm that is used within the invention.

Referring now to FIG. 7 there is shown a magnified side elevational view in the direction noted in FIG. 6 of a cross section of the telescoping arm 40 and associated operating mechanism. The inner member 41 is shown rotatably connected to the bottom of the electronics package 24 by a hinge 62. The hinged end of the member 41 as well as the hinge 62 are constructed and formed in a manner well known in the art such that when the array 18 is packaged before deployment the member 26 is folded vertically and lies adjacent to the outer surface of the package 24, but when deployed the member 41 is pulled to a horizontal position as shown in the figure and is prevented from further horizontal displacement by the construction of the hinge 62 thereby providing for a lowermost locked position of the member 41 and the telescoping arm 40. Secured to the interior of the inner member 41 and near the outermost edge thereof is a pulley 64 which is rotatably pinned within the member. An appropriately positioned opening is provided in the bottom portion of the closed channel of the member 41 to allow for the entrance of the support cable 56 which passes over the pulley 64 and is terminally secured to a tie point bracket 66 which is securably attached to the inner channel of the telescoping arm 40. As tension is placed on the support cable 56 and the cable is drawn downwards, the tie bracket 66 is drwn even nearer to the pulley 64 thus telescoping the arm 40 outwardly from the hinge 62 until the bracket 66 is forced to stop against the pulley 64 thereby maintaining the telescoping arm 40 in the maximum distended position. In order to keep the arm 40 in close slidable contact with the inner member 41 a pair of securing pins 68 are passed through the telescoping arm 40 and under the inner member 41. The remaining upper and lower telescoping arm assemblies are identically constructed according to the description given hereinbefore.

Referring again to the various figures noted hereinbefore, the operation of the invention will now be explained. The packaged array 18 is folded as shown in FIG. 1 and stored within the midsection of the canister 12. The telescoping arms 40, 42 are compressed to their nonextended positions and are respectively folded in radial fashion adjacent the outer periphery of the electronics package 24 which is positioned at the center of the folded array 18. The sequence of the packaged components which are arranged about the outer surface of the package 24 comprises a lower telescoping arm 42 adjacent an upper telescoping arm 40, followed by a nest of two hydrophone packages 26 in coaxial alignment with one another followed by the next succeeding arrangement of upper and lower telescoping arms 40, 42. When nested in the folded array, 18, the hydrophone packages 26 provide a radial protrusion from the center of the package 24 which is approximately equal to similar protrusions provided by the positioning of the folded telescoping arms. Accordingly, the folded array 18, including the nested hydrophone packages 26, presents a substantially cylindrical outer surface which is easily positioned within the canister 12 and which most efficiently utilizes the available canister space.

When deployed in water, the antenna float 14 is released from the canister 12 by the energization of a conventional water activated release assembly (not shown) which may comprise, for example, a water activated battery which fires a squib charge thereby releasing the float 14 by means of the cable from the canister 12. Concurrently, at the moment of impact with the water, the conventional release plug 27 positioned at the bottom of the canister 12 is unlocked from contact therewith by the application, for example, of water pressure upon a series of releasably secured mechanical fingers (not shown) connected between the plug 27 and the inner wall of the canister 12. The plug 27, however, remains in place due to the still continuing vertical descent of the canister 12 within the water body. During such descent, the cable 36 pays out from the cable pack 16 which remains within the canister 12. At a predetermined depth, determined for example, by the length of cable stored within the cable pack 16, the canister 12 ends its descent at which time the remaining components held within the canister are forced therefrom along with the plug 27.

FIG. 3 illustrates the deployed sonobuoy package with the transducer array fully extended. Once forced out from the canister 12, the folded array 18 is deployed by the opposing forces presented by the antenna float 14 at the surface of the water 15 and the weight of the driver unit 20. The folded array begins its initial deployment by the falling away of the folded upper and lower telescoping arms 40, 42 from around the periphery of the electronics package 24. This unfolding operation is caused by the plurality of hydrophone stave lines 46 which interconnect the outer extremities of the upper set of telescoping arms 40 with the lower set of telescoping arms 42. Concurrent with the tensing of the lines 46, the individual hydrophone packages 26 which were formally nested within the folded array 18 now are pulled apart with the end caps **30*a*, 30*b* as well as the sheathing 28 being shucked from the hydrophone 34 and preamplifier 32 assemblies. Also, the angle support lines 48, 56 which cause the arms 40, 42 to telescope outwardly are all actuated by the tensing of the cables 58 and 50**, respectively.

FIG. 7 illustrates a sectional view of one of the telescoped arms 40 in its distended position and also illustrates by the dotted lines shown therein the collapsed position of the arm 40 in relationship to the inner member 41. As each of the actuating lines 56 is tensed during the deployment operation, the telescoping arm 40 is pulled outwardly from the center of the electronics package 24 by means of a pulley 64 and a cable 56 being terminated at the tie point bracket 66. The telescoping operation continues until the bracket 66 locks against the pulley 64 at which time the entire array is in its fullly deployed position as shown in FIG. 3. At this time, the driver unit 20 will have descended to its lowermost deployed position and the projection rings **22*a–c* will have separated from the unit 20 and be supported in coaxial alignment with the projector unit by the rubber line sections 52**.

The particular embodiment of the deployed invention shown in FIG. 3 illustrates an active transducer array in that it is intended that the driver unit 20 as well as the projector rings 22 effect the transmission of acoustic signals into the surrounding water area. In response thereto, the hydrophones 34 and preamplifiers 32 are intended to receive any reflected signals from possible submerged targets or other items of interest and transmit the received information back to the electronics package 24 by means of the electrical cables 54 and which received information is ultimately connected to the antenna float 14 at the water surface 15 for transmission to a remote receiving station. Obviously, the transducer array and erecting structure of the present invention may also be used as a purely passive device without the need for inclusion of a transmission or drive unit and the substitution of a terminal mass in place of the unit 20 may easily be made.

Thus, it may be seen that there has been provided a self-erecting structure of novel construction for the extension and support of transducer equipment arranged in a volumetric array and which is of a small size and light weight and conveniently packageable within a conventional sonobuoy canister.

Obviously, many modifications and variations of the invention are possible in light of the above teachings. It is therefore to be understood that within the scope of the appended claims the invention may be practiced otherwise than as specifically described.

What is claimed is:

1. A self-erecting transducer array for deployment between a float and a terminal mass, comprising, in combination:

first erecting means having a plurality of radially telescoping arms having inner and outer ends, said arms being operatively secured in common at the respective inner ends thereof to the float;

a plurality of flexible stave lines secured at respective one ends thereof to the outer ends of said first erecting means telescoping arms and having a plurality of transducer sensors attached along the individual lengths of each of said lines;

second erecting means having a plurality of radially telescoping arms equal in number to said first erecting means plurality, said arms having inner and outer ends and being secured at the respective outer ends thereof to the other ends of said stave lines; and means connected to said first and second erecting means and to the terminal mass for causing said telescoping arms to expand to the deployed position when the mass descends from the float.

2. A self-erecting transducer array according to claim 1 wherein said first erecting means further comprises:

cylindrical support means operatively attached at one end at the center thereof to the float and having a plurality of hinges radially secured about the center of the opposite end;

a plurality of elongated inner members respectively and rotatably attached at one ends thereof to corresponding ones of said support means hinges for rotating from folded positions adjacent the circular surface of said cylindrical support means to deployed positions normal to the cylindrical axis and extending radially therefrom; and a like plurality of elongated outer members slidably secured over corresponding ones of said inner members in linear alignment therewith and being attached at respective one ends thereof to predetermined ones of said stave lines;

whereby corresponding ones of said inner and outer members form said first erecting means telescoping arms.

3. A self-erecting transducer array according to claim 2 wherein said inner and outer members are U-channelled rectangular material having the open channel of the inner member facing and slidably registered within the open channel of the outer member.

4. A self-erecting transducer array according to claim 2 wherein said second erecting means further comprises:

a circular support plate secured on one side at the center thereof to said expansion means and having a plurality of hinges radially secured about the center of the other side;

a plurality of elongated linner members respectively and rotatably attached at one ends thereof to corresponding ones of said support plate hinges for rotating from folded positions normal to the plane of said support plate to deployed positions parallel to the plane of said support plate;

a like plurality of elongated outer members slidably secured over corresponding ones of said inner members in linear alignment therewith and being attached at respective one ends thereof to predetermined ones of said stave lines;

whereby corresponding ones of said inner and outer members form said second erecting means telescoping arms.

5. A self-erecting transducer array according to claim 4 wherein said inner and outer members are U-channelled rectangular material having the open channel of the inner member facing and slidably registered within the open channel of the outer member.

6. A self-erecting transducer array according to claim 4 wherein said expansion means further comprises:

first actuating means having a plurality of cables attached at respective one ends thereof to said first erecting means outer members for causing said outer members to slide radially outward upon said first erecting means inner members and having the other ends of said cables secured in common to said one side of said second erecting means; and second actuating means having a plurality of cables attached at respective one ends thereof to said second erecting means outer members for causing said outer members to slide radially outward upon said second erecting means inner members and having the other ends of said cables secured in common to the terminal mass.

7. A self-erecting transducer array according to claim 6 wherein said first and second actuating means each further comprise:

a pulley rotatably secured in each of said inner members at the other ends thereof for receiving respective ones of said actuating means cables; and an end stop secured in each of said outer members at the other ends thereof for terminating and securing the respective ends of each of said actuating cables drawn over corresponding ones of said pulleys and for locking said outer member against said inner member when said arms are fully telescoped.

8. A self-erecting transducer array suitable for packing in a canister, comprising, in combination:

a float;

a cylinder operatively attached at one end thereof to said float and having a plurality of hinges radially secured to the other end of said cylinder about the circumference thereof;

a first plurality of telescoping arms having inner and outer ends, said arms being rotatably secured at the inner ends thereof to respective ones of said cylinder hinges and being folded adjacent the circular surface of said cylinder parallel with the cylindrical axis thereof;

a circular plate positioned adjacent said cylinder hinges and being operatively attached at the center of one side thereof to said first plurality of telescoping arms and having a plurality of hinges radially secured to the other side about the circumference thereof;

a second plurality of telescoping arms having inner and outer ends, said arms being rotatably secured at the inner ends thereof to respective ones of said plate hinges and being folded adjacent said first plurality of folded telescoping arms;

a plurality of transducer assemblies nested between sequential pairs of corresponding ones of the folded adjacent first and second pluralities of telescoping arms, said assemblies being respectively secured by flexible stave lines to the outer ends of opposing ones of said first and second pluralities of telescoping arms;

a terminal mass operatively secured in common to said second plurality of telescoping arms; and means connected to said first and second plurality of telescoping arms and to said terminal mass for causing said telescoping arms to expand to the deployed position when said mass descends from said float;

whereby the telescoping arms and transducer assemblies self-erect between said float and terminal mass when deployed from the canister.

9. A transducer array according to claim 8 wherein each of said telescoping arms further comprises:

an elongated rectangular outer member having an open U-channel along its length; and an elongated rectangular inner member having an open U-channel along its length and being slidably registered within said outer member wherein the open U-channels of both said outer and inner members face each other.

10. A transducer array according to claim 9 wherein each of said transducer assemblies further comprises:

at least one transducer secured at the ends thereof to a preselected one of said stave lines;

a resilient sheath furled to a cylindrical configuration around said transducer; and opposing end caps each having a cylindrical configuration open at one end and secured over the open ends of said furled cylindrical sheath, and forming a slot on the cylindrical surface parallel with the cylindrical axis beginning at a point on the open end and continuing substantially midway along said axis, said slots being formed to receive said transducer stave line;

whereby said end caps and said sheath deploy and unfurl from said transducer when said stave line is tensed.

* * * * *